(12) United States Patent
Marolla et al.

(10) Patent No.: US 12,376,517 B2
(45) Date of Patent: Aug. 5, 2025

(54) LAWNMOWER DISCHARGE ACCESSORIES

(71) Applicant: MILWAUKEE ELECTRIC TOOL CORPORATION, Brookfield, WI (US)

(72) Inventors: David Marolla, Menomonee Falls, WI (US); Shane McCue, Greenfield, WI (US); Hans T. Banholzer, Mequon, WI (US); John L. Whealon, West Bend, WI (US); Ryan Gunderson, Jackson, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

(21) Appl. No.: 18/508,625

(22) Filed: Nov. 14, 2023

(65) Prior Publication Data
US 2024/0074347 A1    Mar. 7, 2024

Related U.S. Application Data

(62) Division of application No. 17/885,385, filed on Aug. 10, 2022, now Pat. No. 11,844,306.
(Continued)

(51) Int. Cl.
*A01D 34/71*    (2006.01)
*A01D 34/00*    (2006.01)
(Continued)

(52) U.S. Cl.
CPC ........... *A01D 34/71* (2013.01); *A01D 34/005* (2013.01); *A01D 34/81* (2013.01); *A01D 43/06* (2013.01);
(Continued)

(58) Field of Classification Search
CPC ...... A01D 34/71; A01D 34/005; A01D 34/81; A01D 43/06; A01D 43/063;
(Continued)

(56) References Cited

U.S. PATENT DOCUMENTS

| | | |
|---|---|---|
| 3,230,696 A | 1/1966 | Liljenberg |
| 3,579,966 A | 5/1971 | Allina |

(Continued)

FOREIGN PATENT DOCUMENTS

| | | |
|---|---|---|
| CA | 2244024 C | 1/2003 |
| CN | 101610937 A | 12/2009 |

(Continued)

OTHER PUBLICATIONS

International Search Report and Written Opinion for Application No. PCT/US2022/039988 dated Nov. 25, 2022 (9 pages).

*Primary Examiner* — Arpad Fabian-Kovacs
(74) *Attorney, Agent, or Firm* — Dority & Manning, P.A.

(57) ABSTRACT

A mulch plug accessory for a lawnmower includes a curvilinear plug wall having a convex side, and a plurality of alignment legs extending in a direction away from the convex side of the curvilinear plug wall. Each alignment leg has a distal end including a stop flange. The mulch plug accessory further includes a post extending in a direction away from the convex side of the curvilinear plug wall. A lawnmower including a main body having an ejection port also includes a mulch plug accessory configured to be selectively disposed within the ejection port.

20 Claims, 14 Drawing Sheets

Related U.S. Application Data

(60) Provisional application No. 63/231,677, filed on Aug. 10, 2021.

(51) Int. Cl.
| | |
|---|---|
| *A01D 34/81* | (2006.01) |
| *A01D 43/06* | (2006.01) |
| *A01D 43/063* | (2006.01) |
| *A01D 101/00* | (2006.01) |

(52) U.S. Cl.
CPC ........ *A01D 43/063* (2013.01); *A01D 43/0631* (2013.01); *A01D 43/0635* (2013.01); *A01D 43/0638* (2013.01); *A01D 2101/00* (2013.01)

(58) Field of Classification Search
CPC ............ A01D 43/0631; A01D 43/0635; A01D 43/0638; A01D 2101/00
See application file for complete search history.

(56) References Cited

U.S. PATENT DOCUMENTS

| | | |
|---|---|---|
| D227,286 S | 6/1973 | Thorud |
| 3,750,378 A | 8/1973 | Thorud et al. |
| 3,820,313 A | 6/1974 | Hoffmann |
| 4,047,367 A | 9/1977 | Thorud |
| 4,126,986 A | 11/1978 | Kidd |
| 4,214,424 A | 7/1980 | Gobin |
| D304,728 S | 11/1989 | Piorkowski |
| 4,897,988 A | 2/1990 | Schweitz et al. |
| 4,951,449 A * | 8/1990 | Thorud ................ A01D 42/005 56/DIG. 17 |
| D311,009 S | 10/1990 | Wilkins |
| D346,810 S | 5/1994 | Schulz et al. |
| 5,398,491 A | 3/1995 | Hartley |
| D359,291 S | 6/1995 | Tihonovich |
| D390,576 S | 2/1998 | Shimamura |
| 5,910,091 A | 6/1999 | Iida et al. |
| D421,265 S | 2/2000 | Ohsumi et al. |
| 6,044,634 A | 4/2000 | Velke et al. |
| D424,070 S | 5/2000 | Danthois |
| 6,085,508 A * | 7/2000 | Miatt ................ A01D 34/74 56/15.5 |
| 6,155,034 A | 12/2000 | Velke et al. |
| D450,064 S | 11/2001 | Concari et al. |
| D489,734 S | 5/2004 | Lin |
| 6,735,932 B2 * | 5/2004 | Osborne ............ A01D 42/005 56/320.1 |
| 6,862,875 B2 * | 3/2005 | Iida ................ A01D 34/71 56/320.2 |
| 6,990,793 B2 * | 1/2006 | Osborne ............ A01D 42/005 56/320.1 |
| D544,501 S | 6/2007 | Chung Lee |
| D600,254 S | 9/2009 | Lindars et al. |
| D605,667 S | 12/2009 | Peterson et al. |
| 7,726,110 B2 | 6/2010 | Nicholson |
| D620,029 S | 7/2010 | Baetica |
| D627,371 S | 11/2010 | Baetica |
| 7,823,373 B1 * | 11/2010 | Loxterkamp ........ A01D 34/667 56/320.2 |
| D648,354 S | 11/2011 | Hattori et al. |
| 8,046,980 B1 | 11/2011 | Schroeck |
| D652,846 S | 1/2012 | Stratford et al. |
| D653,265 S | 1/2012 | Stratford et al. |
| D665,823 S | 8/2012 | Hannig |
| D685,822 S | 7/2013 | Elgin et al. |
| D834,071 S | 11/2018 | Näslund et al. |
| D834,072 S | 11/2018 | Näslund et al. |
| 10,897,845 B2 * | 1/2021 | Walker ................ A01D 34/71 |
| 2002/0023421 A1 * | 2/2002 | Kutsukake ............ A01D 34/71 56/320.1 |
| 2003/0182919 A1 * | 10/2003 | Baumann ................ A01D 34/71 56/320.1 |
| 2004/0237493 A1 | 12/2004 | Schroeder et al. |
| 2005/0257964 A1 | 11/2005 | Derby |
| 2006/0042218 A1 * | 3/2006 | Plouraboue .......... A01D 43/063 56/320.2 |
| 2007/0271892 A1 | 11/2007 | Sasaoka |
| 2009/0266042 A1 | 10/2009 | Mooney et al. |
| 2010/0281838 A1 * | 11/2010 | Walker ................ A01D 34/005 56/14.7 |
| 2011/0022267 A1 | 1/2011 | Murphy |
| 2011/0203245 A1 * | 8/2011 | Campbell ............ A01D 42/005 56/320.1 |
| 2013/0097987 A1 * | 4/2013 | Kaskawitz ............ A01D 42/00 56/320.2 |
| 2014/0157747 A1 | 6/2014 | Shoji et al. |
| 2016/0047463 A1 | 2/2016 | Helin et al. |
| 2016/0338266 A1 | 11/2016 | Yamaoka et al. |
| 2017/0006763 A1 | 1/2017 | Bejcek et al. |
| 2017/0202140 A1 | 7/2017 | Lopez et al. |
| 2018/0160620 A1 | 6/2018 | Wang et al. |
| 2019/0269067 A1 | 9/2019 | Fukano et al. |
| 2019/0289781 A1 * | 9/2019 | Meeks ................ A01D 34/71 |
| 2019/0289784 A1 * | 9/2019 | Meeks ................ F16B 4/004 |
| 2020/0107497 A1 | 4/2020 | Ferrell et al. |
| 2020/0323130 A1 * | 10/2020 | Shaffer ................ A01D 34/71 |
| 2020/0375095 A1 | 12/2020 | Koto et al. |
| 2021/0251143 A1 | 8/2021 | Gaeddert et al. |

FOREIGN PATENT DOCUMENTS

| | | | |
|---|---|---|---|
| CN | 210202483 U | 3/2020 | |
| CN | 111406498 A | 7/2020 | |
| CN | 211671393 U | 10/2020 | |
| DE | 154054 A1 | 2/1982 | |
| EP | 3437453 B1 | 3/2021 | |
| JP | H02127113 U | 10/1990 | |
| JP | H0356175 Y2 * | 12/1991 | ............ B05D 5/06 |
| JP | H06169624 A | 6/1994 | |
| JP | 2007116958 A | 5/2007 | |
| JP | 2016187978 A1 | 11/2016 | |
| KR | 20020055433 A | 7/2002 | |
| KR | 1020060046012 A | 5/2006 | |
| WO | 9410827 A1 | 5/1994 | |
| WO | 2010002298 A1 | 1/2010 | |
| WO | 2010024696 A1 | 3/2010 | |
| WO | 2014062176 A1 | 4/2014 | |

* cited by examiner

LAWNMOWER DISCHARGE ACCESSORIES

CROSS-REFERENCE TO RELATED APPLICATIONS

This application is a divisional of co-pending U.S. patent application Ser. No. 17/885,385 filed on Aug. 10, 2022, which claims the benefit of U.S. Provisional Patent Application No. 63/231,677, filed on Aug. 10, 2021, the entire contents of each of which are incorporated by reference herein.

BACKGROUND

The present disclosure relates to lawnmowers, and more particularly to discharge accessories for lawnmowers.

SUMMARY

The present disclosure provides, in one aspect, a discharge accessory for a lawnmower. The discharge accessory includes an inlet end and a hook disposed at the inlet end. The hook defines a channel. A lever arm extends from the hook in a direction transverse to the channel, and a protrusion is disposed in the channel. The protrusion extends in a first direction transverse to the channel and to the lever arm, and the protrusion extends in a second direction transverse to the channel.

The present disclosure provides, in another aspect, a mulch plug accessory for a lawnmower. The mulch plug accessory includes a curvilinear plug wall having a convex side, a plurality of alignment legs extending from the convex side of the curvilinear plug wall, and a post extending from the convex side of the curvilinear plug wall. Each alignment leg has a distal end including a stop flange.

The present disclosure provides, in yet another aspect, a lawnmower including a main body including an ejection port having an interior opening and an exterior opening, a mounting interface disposed adjacent the exterior opening, and a discharge accessory removably coupled to the mounting interface. The mounting interface includes a first rib, a second rib spaced apart from the first rib, and a recess defined between the first rib and the second rib. The discharge accessory includes an inlet end configured to be aligned with the exterior opening, and a hook disposed at the inlet end and configured to be coupled to the mounting interface between the first rib and the second rib. The hook defines a channel configured to receive a portion of the mounting interface therein when the discharge accessory is coupled to the mounting interface. The discharge accessory further includes a protrusion disposed in the channel. The protrusion is configured to be received within the recess when the discharge accessory is coupled to the mounting interface.

Other features and aspects of the disclosure will become apparent by consideration of the following detailed description and accompanying drawings.

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
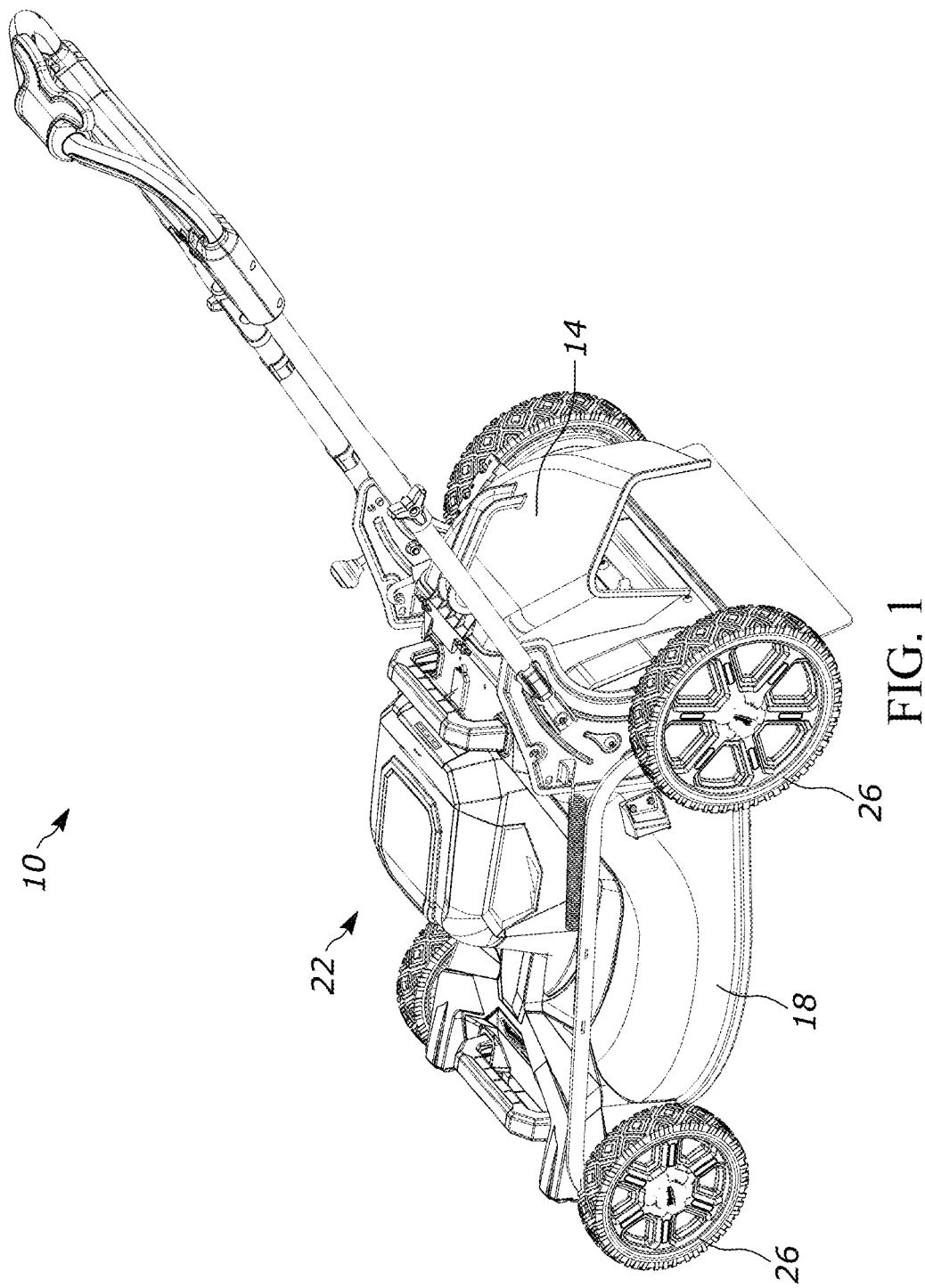
FIG. 1 is a perspective view of a lawnmower including a discharge accessory in accordance with an embodiment of the present disclosure.

FIG. 1 illustrates a lawnmower 10 having a discharge accessory 14, depicted as a side discharge assembly, removably attached thereto. The lawnmower 10 includes a main body 18, a motor 22 mounted to the main body 18, and a plurality of wheels 26 for supporting the main body 18. The motor 22 is coupled to a blade (not shown) and configured to rotate the blade about an axis to physically cut grass or other vegetation during use of the lawnmower 10. The motor 22 of the illustrated lawnmower 10 is an electric motor powered by one or more batteries (not shown). However, it is understood that in alternative embodiments an internal combustion engine or other forms of power may be used to rotate the blade relative to the main body 18.

Figure 2:
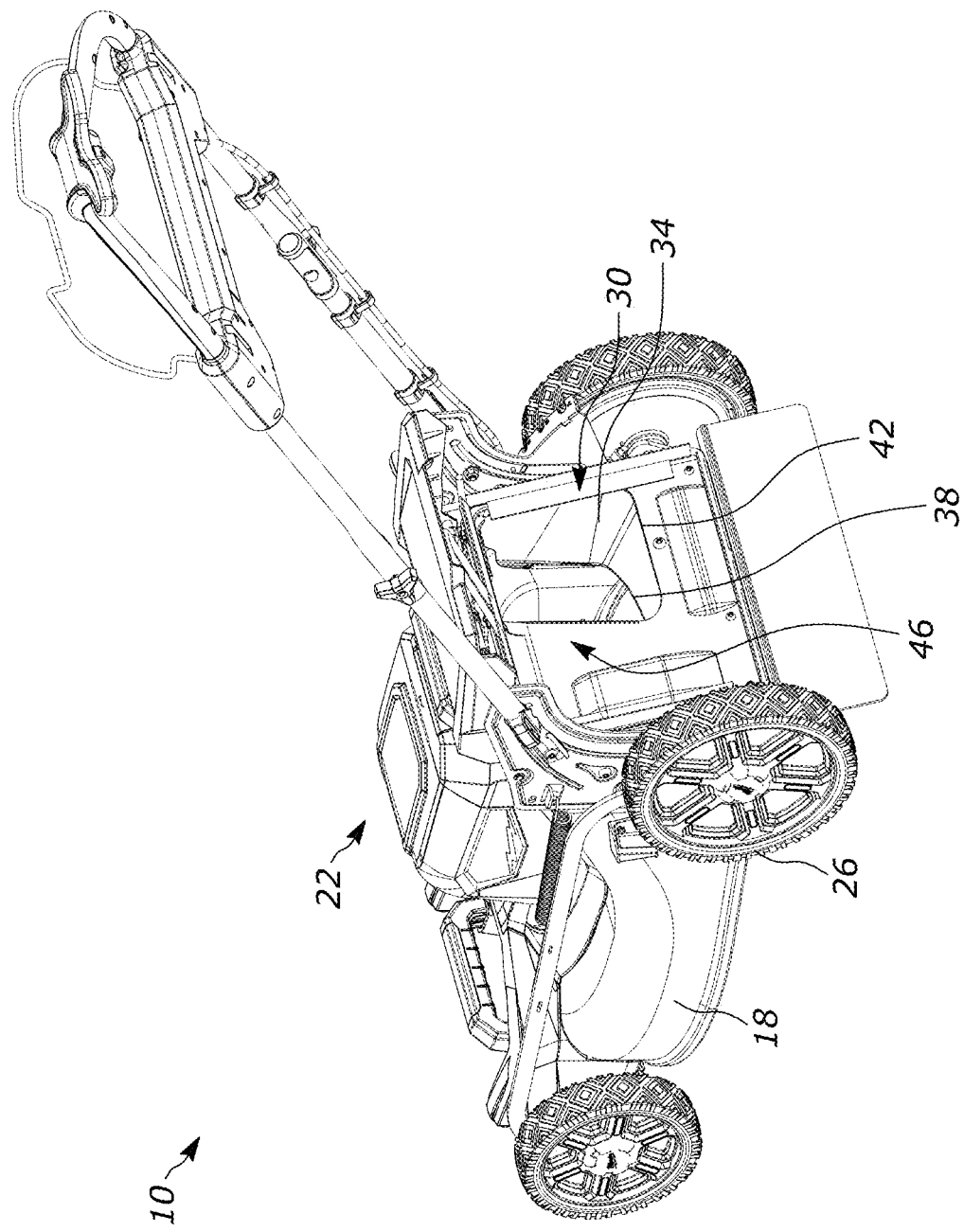
FIG. 2 is a rear perspective view of the lawnmower of FIG. 1, with the discharge accessory removed.
Figure 3:
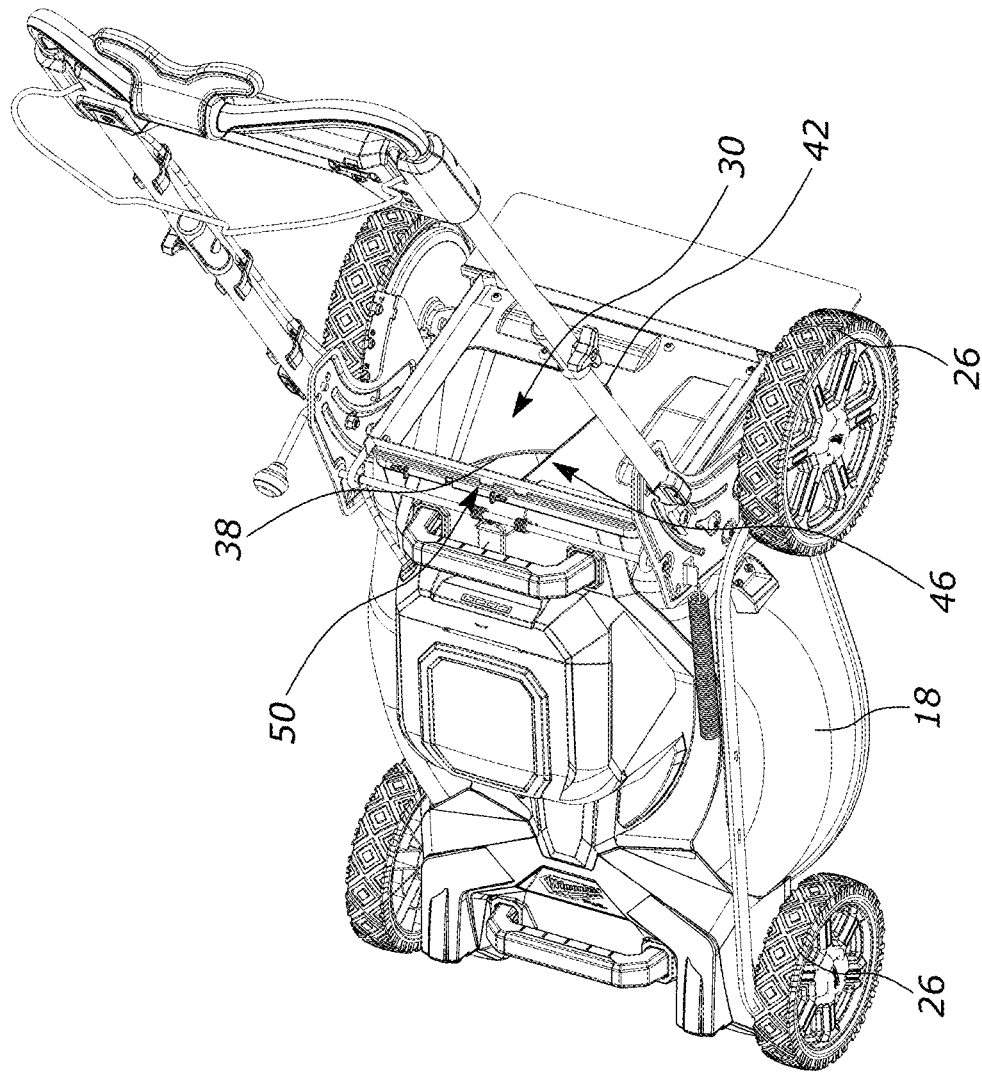
FIG. 3 is a rear perspective view of the lawnmower of FIG. 1, with the discharge accessory removed.
Figure 4:
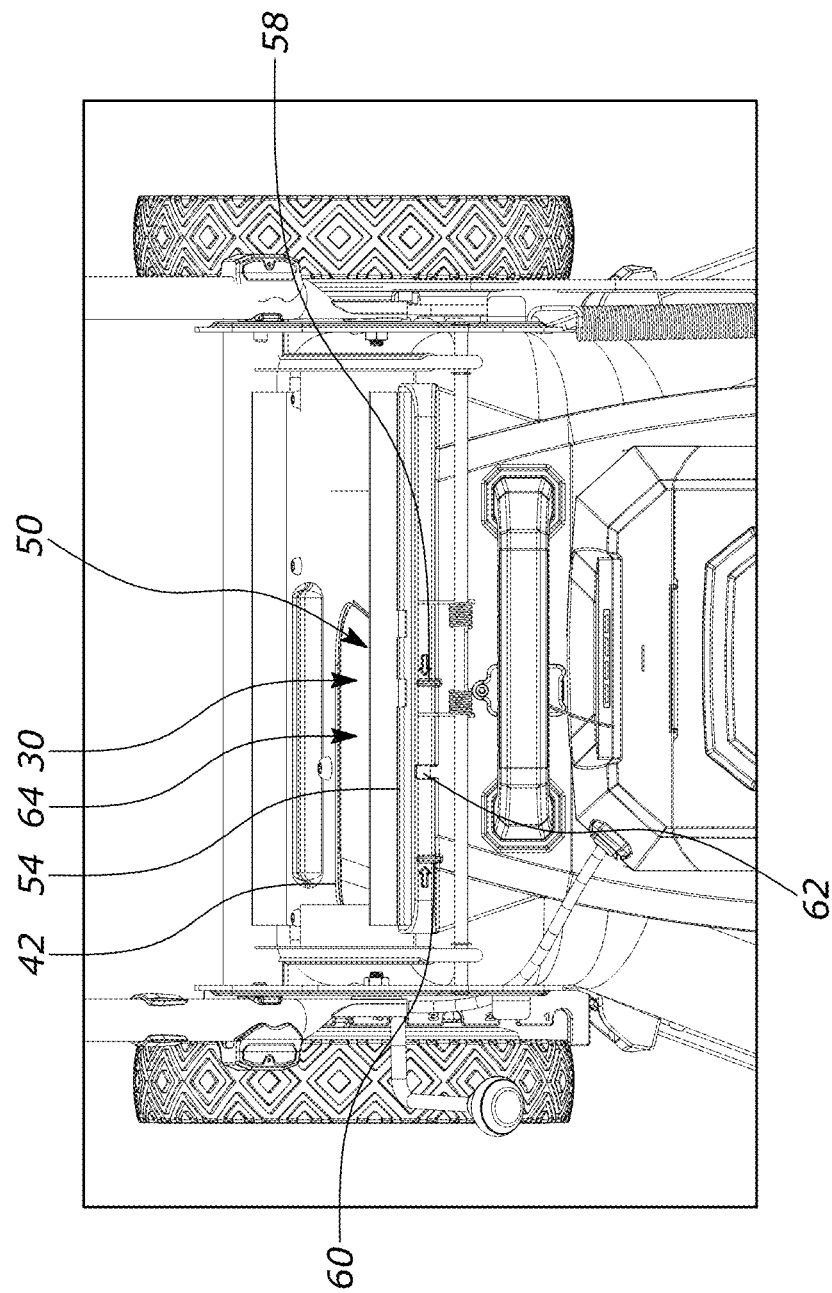
FIG. 4 is a detailed plan view of the lawnmower of FIG. 1 depicting a mounting interface.

With reference to FIGS. 2-4, the main body 18 includes an ejection port 30 through which grass and other vegetation may be ejected during use. The ejection port 30 includes an elongated channel 34 extending between an interior end or opening 38 proximate the blade and an exterior end or opening 42. In the illustrated embodiment, the exterior opening 42 is positioned proximate a side of the lawnmower 10 from which a user controls the lawnmower 10 during use (e.g., a rear side). However, it will be understood that in other embodiments the exterior opening 42 may be positioned proximate other sides of the lawnmower 10. In each embodiment, the ejection port 30 extends from within the main body 18 to outside of the main body 18. A perimeter of the exterior opening 42 defines a border 46 that the discharge accessory 14 is positioned adjacent to during use.

A mounting interface (e.g., a mount) 50 is coupled to the main body 18 adjacent the border 46 of the exterior opening. In some embodiments, the mount 50 may be integrally formed with the main body 18. The mount 50 defines an attachment point for the discharge accessory 14 and includes a ridge 54 extending along a portion of the border 46, a first rib 58 and a second rib 60 spaced apart from one another (e.g., offset) along a length of the ridge 54, and a recess 62 extending into the ridge 54. A mounting region 64 of the ridge 54 is defined between the first rib 58 and the second rib 60, and the recess 62 is positioned in the mounting region 64. More particularly, the recess 62 is positioned in the mounting region 64 centrally between the first rib 58 and the second rib 60 (e.g., at a midpoint of the mounting region 64). The ridge 54, the first rib 58, the second rib 60, and the central recess 62 locate and secure the discharge accessory 14 relative to the exterior opening 42 during use.

Figure 5:
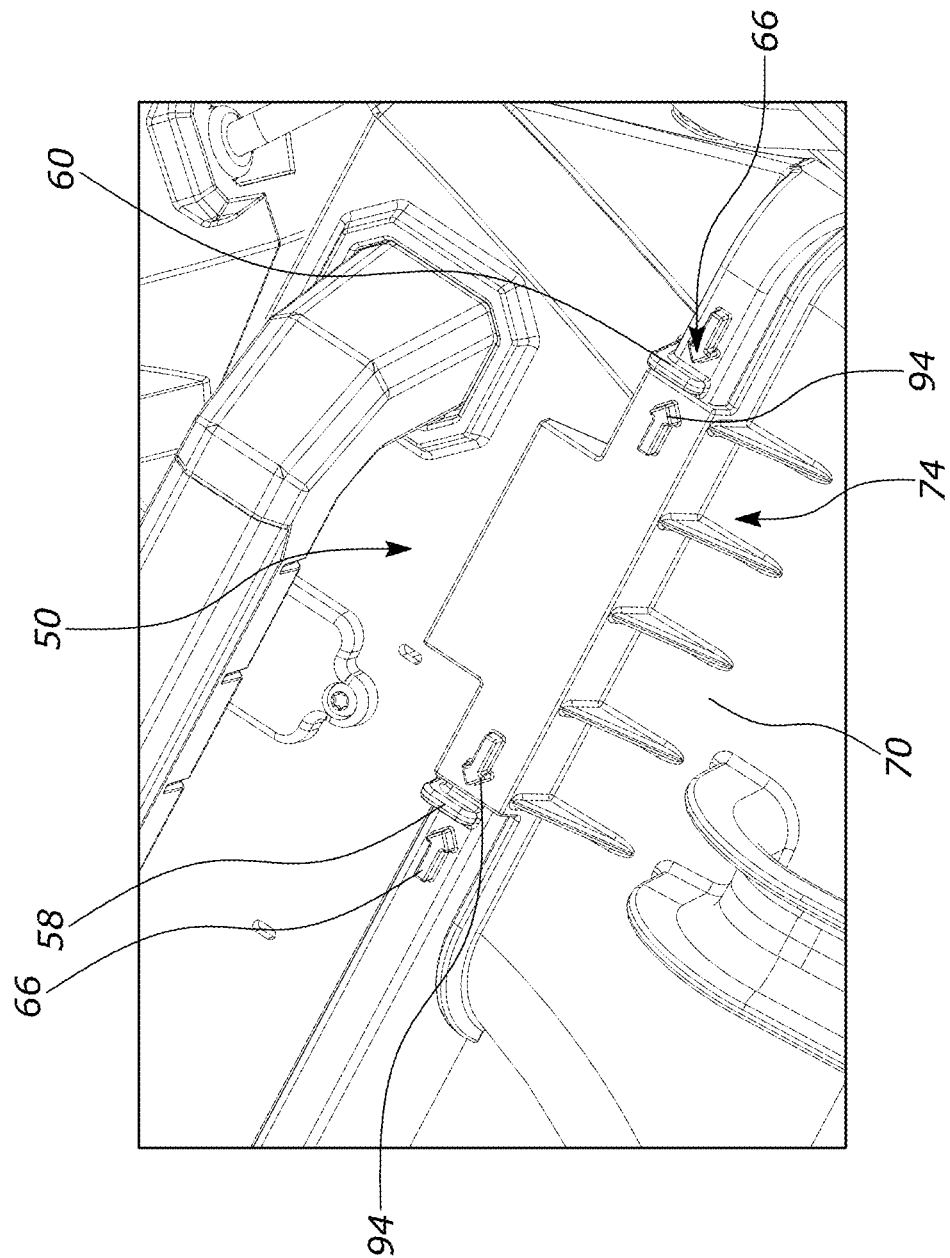
FIG. 5 is a detailed perspective view of the lawnmower of FIG. 1, depicting the mounting interface and the connector of the discharge accessory.
Figure 6:
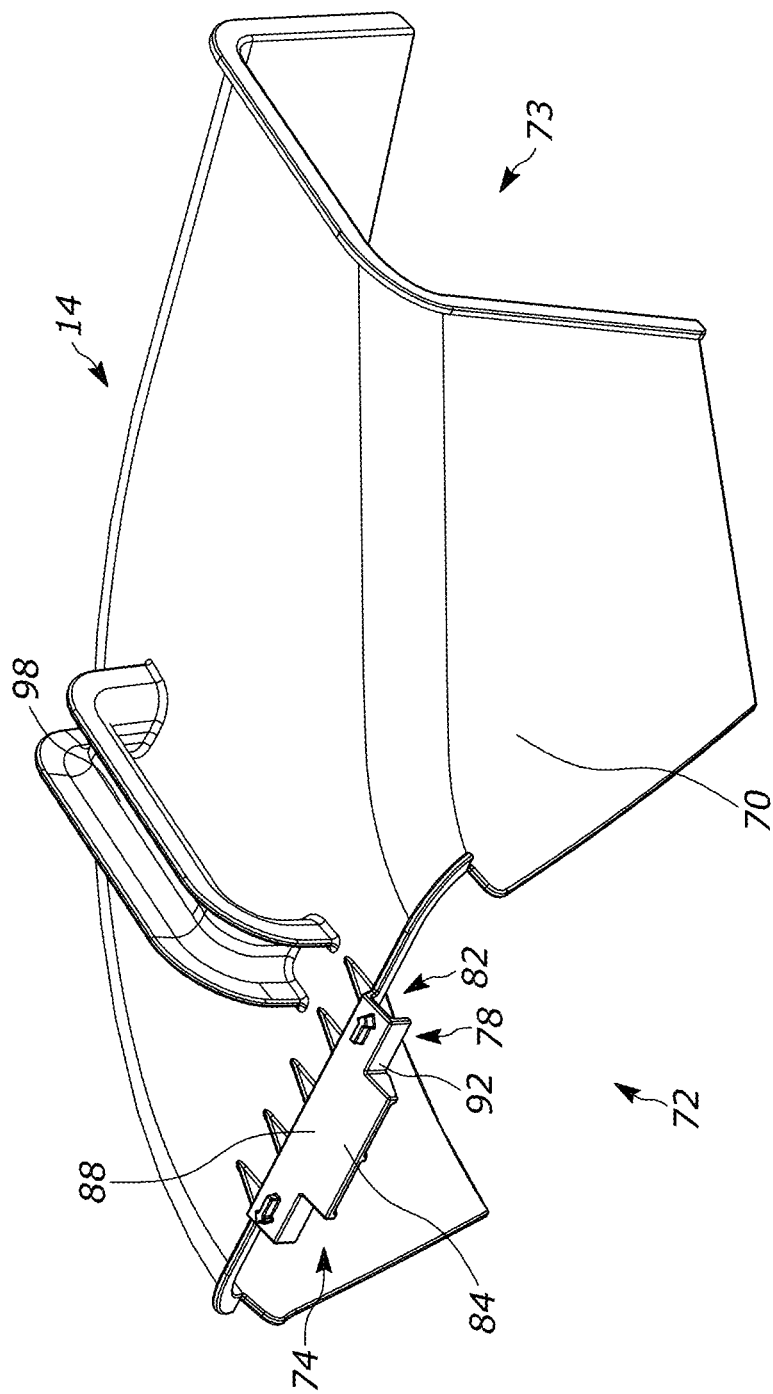
FIG. 6 is a top perspective view of the discharge accessory in FIG. 1.
Figure 7:
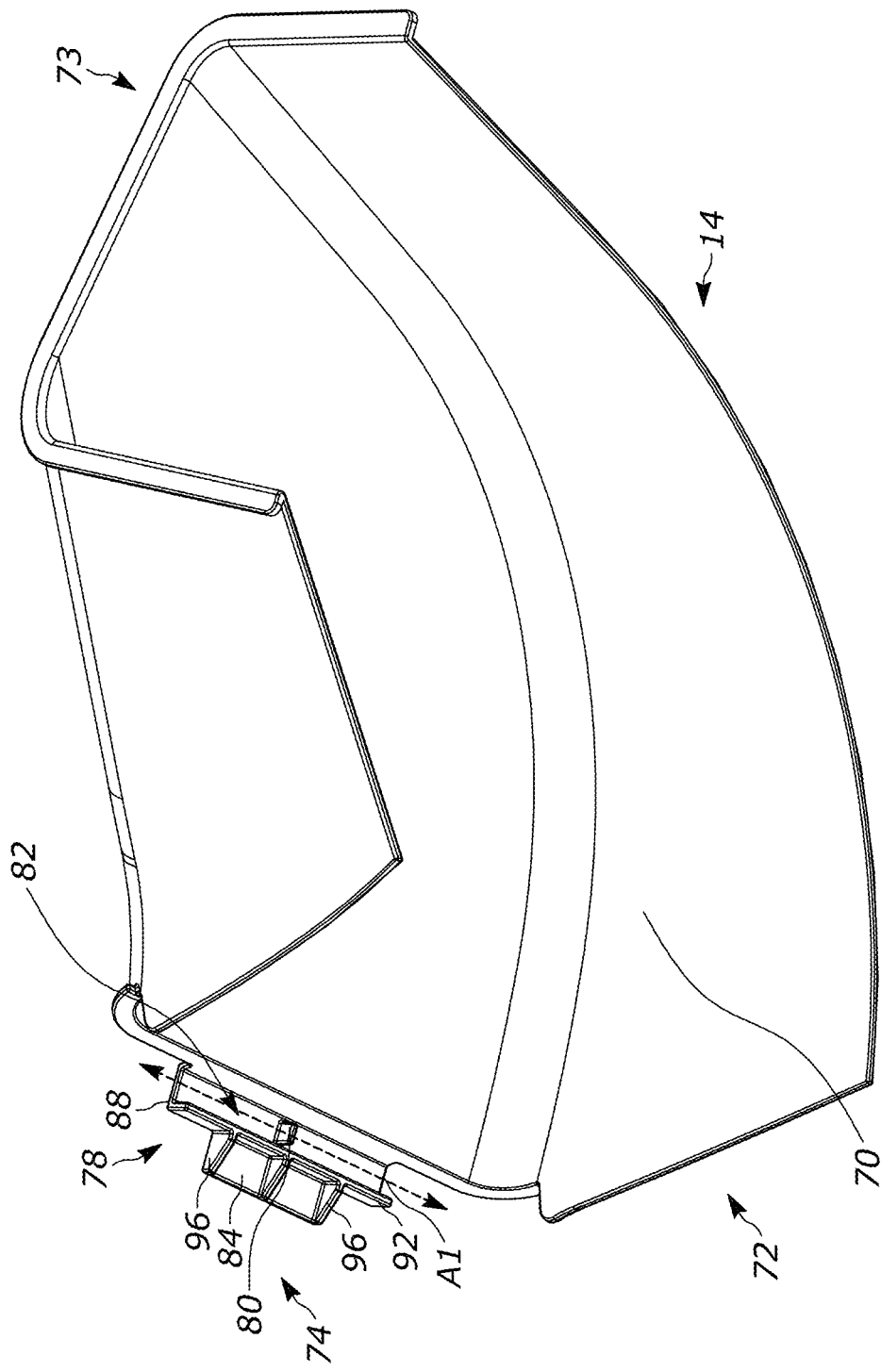
FIG. 7 is bottom perspective view of the discharge accessory of FIG. 6.

With reference to FIG. 5, the mount 50 includes a pair of indicia, depicted as arrows 66, positioned outside of the mounting region 64 and adjacent the first rib 58 and the second rib 60, respectively. The arrows 66 point inwards (e.g., towards the mounting region 64) to assist a user in identifying the mounting region 64.

With reference to FIGS. 6-9, the discharge accessory 14 includes a body 70 for receiving and re-directing grass and other vegetation that is discharged from the ejection port 30. In the illustrated embodiment, the body 70 includes an inlet end 72 through which grass and other vegetation enters the discharge accessory 14 and an outlet end 73 through which grass and other vegetation exits the discharge accessory 14. The outlet end 73 is unaligned relative to the inlet end 72 such that, in the orientation of FIG. 1, the grass and other vegetation is re-directed from a rear of the lawnmower 10 towards a side of the lawnmower 10. In the illustrated embodiment, the inlet end 72 and the outlet end 73 are transverse. In other words, an axis passing through the inlet end 72 perpendicular to a face of the inlet end 72 is transverse to an axis passing through the outlet end 73 perpendicular to a face of the outlet end 73. However, it is understood that in alternative embodiments the inlet end 72 and the outlet end 73 may be at other orientations relative to one another and even aligned with one another.

A connector 74 releasably couples the discharge accessory 14 to the mount 50 (FIG. 5). The connector 74 is disposed at the inlet end 72 and includes a hook 78 that forms a channel 82. The channel 82 is sized and shaped to receive the ridge 54 therein. A protrusion 80 is disposed in the channel 82, and a lever arm 84 extends from the hook 78 in a direction transverse to the channel 82.

Figure 8:
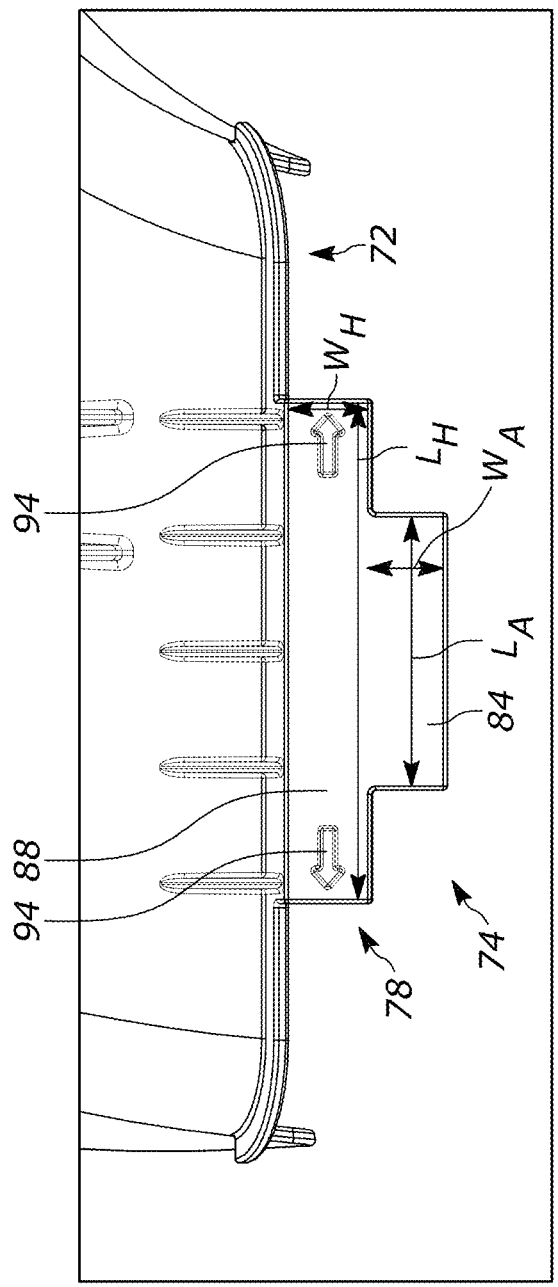
FIG. 8 is a detailed top plan view of a portion of the discharge accessory of FIG. 6.
Figure 9:
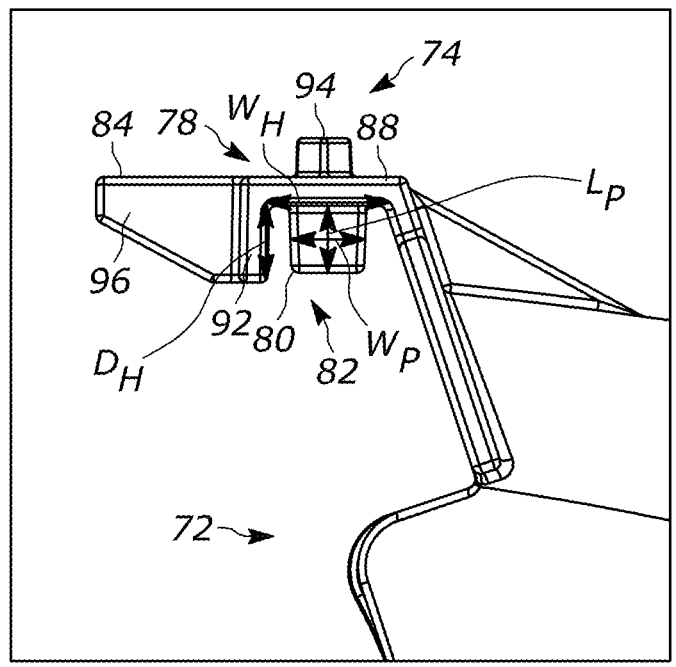
FIG. 9 is a detailed side elevation view of a portion of the discharge accessory of FIG. 6.

With reference to FIGS. 8 and 9, the hook 78 includes a support 88 and a flange 92 extending transverse to the support 88. The channel 82 is defined in part by the space between the flange 92 and the support 88. The support 88 forms an upper surface of the hook 78, and the flange 92 forms a side surface of the hook 78. The hook 78 has a length $L_H$ that corresponds to the mounting region 64. In other words, the length $L_H$ of the hook 78 corresponds to the distance between the first rib 58 and the second rib 60. The hook 78 has a width $W_H$ and a depth $D_H$ that correspond to the ridge 54 so that the ridge 54 can be received within the channel 82. In the illustrated embodiment, the width $W_H$ is twice the depth $D_H$ (e.g., the support 88 is twice the size of the flange 92).

The protrusion 80 is positioned centrally within the channel 82 to align with the recess 62 when the discharge accessory 14 is coupled to the lawnmower 10. The protrusion 80 is also sized to be received within the recess 62 when the discharge accessory 14 is coupled to the lawnmower 10. The protrusion 80 extends from the support 88 (e.g., an inner side of the support 88) in a first direction that is transverse to a longitudinal axis A1 of the channel 82 and to the lever arm 84. The protrusion also extends in a second direction that is transverse to the longitudinal axis A1 of the channel 82 and not transverse to the lever arm 84. In other words, the protrusion extends a length $L_P$ into the channel 82 and extends a width $W_P$. In the illustrated embodiment, the length $L_P$ and the width $W_P$ of the protrusion 80 are equal.

The lever arm 84 extends from the hook 78 and functions as a lever when installing the discharge accessory 14 on the lawnmower 10. The lever arm 84 extends from the flange 92 in a direction away from the channel 82 and is aligned with the support 88. In the illustrated embodiment, the lever arm 84 includes a plurality of strengthening ribs 96 disposed between the lever arm 84 and the flange 92. A length $L_A$ of the lever arm 84 is measured parallel to the length $L_H$ of the hook 78 (e.g., parallel to the longitudinal axis A1) and, in the illustrated embodiment, is less than the length $L_H$ of the hook 78. A width $W_A$ of the lever arm 84 is measured parallel to the width $W_H$ of the hook 78. The width $W_A$ of the lever arm 84 is the distance that the lever arm 84 extends from the flange 92 and forms a working length of the lever arm 84. In the illustrated embodiment, the length $L_A$ of the lever arm 84 is larger than the width $W_A$ of the lever arm 84. More particularly, the length $L_A$ is 4 times greater than the width $W_A$. However, it will be understood that in other embodiments the ratio of the length $L_A$ to the width $W_A$ can vary.

With reference to FIGS. 5 and 8, the discharge accessory 14 includes a pair of indicia, illustrated as arrows 94, positioned on opposite sides of the hook 78. The arrows 94 face outwards and correspond to and align with the arrows 66 of the mount 50 to assist a user in aligning the connector 74 and the mount 50. Furthermore, in the illustrated embodiment and shown particularly in FIG. 6, the discharge accessory 14 includes a handle 98 extending from the body 70. The handle 98 is graspable by a user to aid the user in manipulating the discharge accessory 14 (e.g., attaching and detaching the discharge accessory 14 and the lawnmower 10).

The above-described discharge accessory 14 is formed as a unitary part. More particularly, the discharge accessory 14 is formed as a single injection-molded plastic part. However, it will be understood that in other embodiments the discharge accessory 14 can be formed of other materials or methods and/or as multiple components that are joined together.

Figure 10:
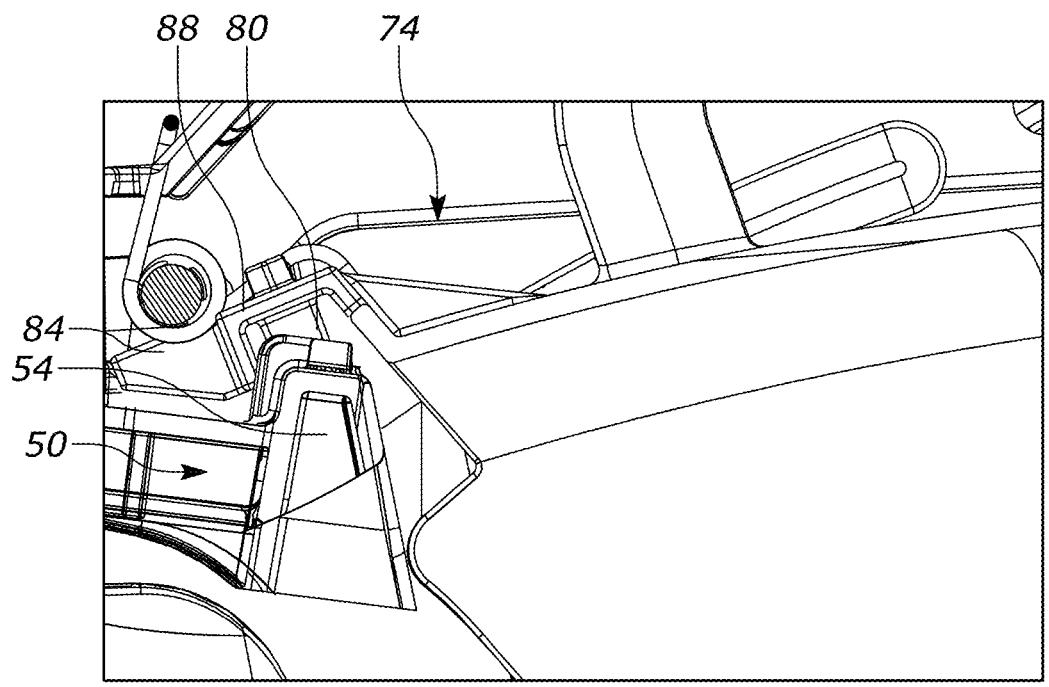
FIG. 10 is a detailed side elevation view of the discharge accessory of FIG. 6 partly installed on the lawnmower.
Figure 11:
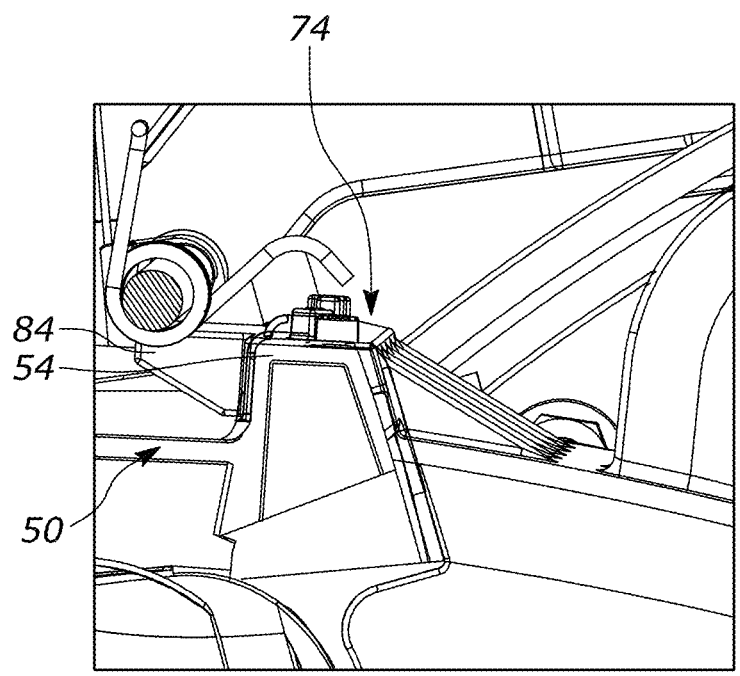
FIG. 11 is a detailed side elevation view of the discharge accessory of FIG. 6 fully installed on the lawnmower.

FIGS. 10-11 illustrate the step-wise installation of the discharge accessory 14 on the lawnmower 10. First, the connector 74 of the discharge accessory 14 is aligned the mount 50 of the lawnmower 10 (e.g., the arrows 94 are aligned with the arrows 66). More particularly, the hook 78 is positioned between the first rib 58 and the second rib 60 such that the protrusion 80 is aligned with the recess 62. The lever arm 84 is inserted past the mount 50 at an angle to be positioned beneath a portion of the lawnmower 10. The user then rotates the discharge accessory 14, using the lever arm 84 for leverage, to snap-fit the connector 74 onto the mount 50. At this time, the ridge 54 is received within the channel 82 of the hook 78, and the protrusion 80 is received within the recess 62. When the discharge accessory 14 is coupled to the lawnmower 10, the inlet end 72 is aligned with the exterior opening 42 of the ejection port 30 to receive cut grass and other vegetation from the ejection port 30 and re-direct the grass and other vegetation towards a side of the lawnmower 10. To remove the discharge accessory 14, the steps are performed in reverse.

Figure 12:
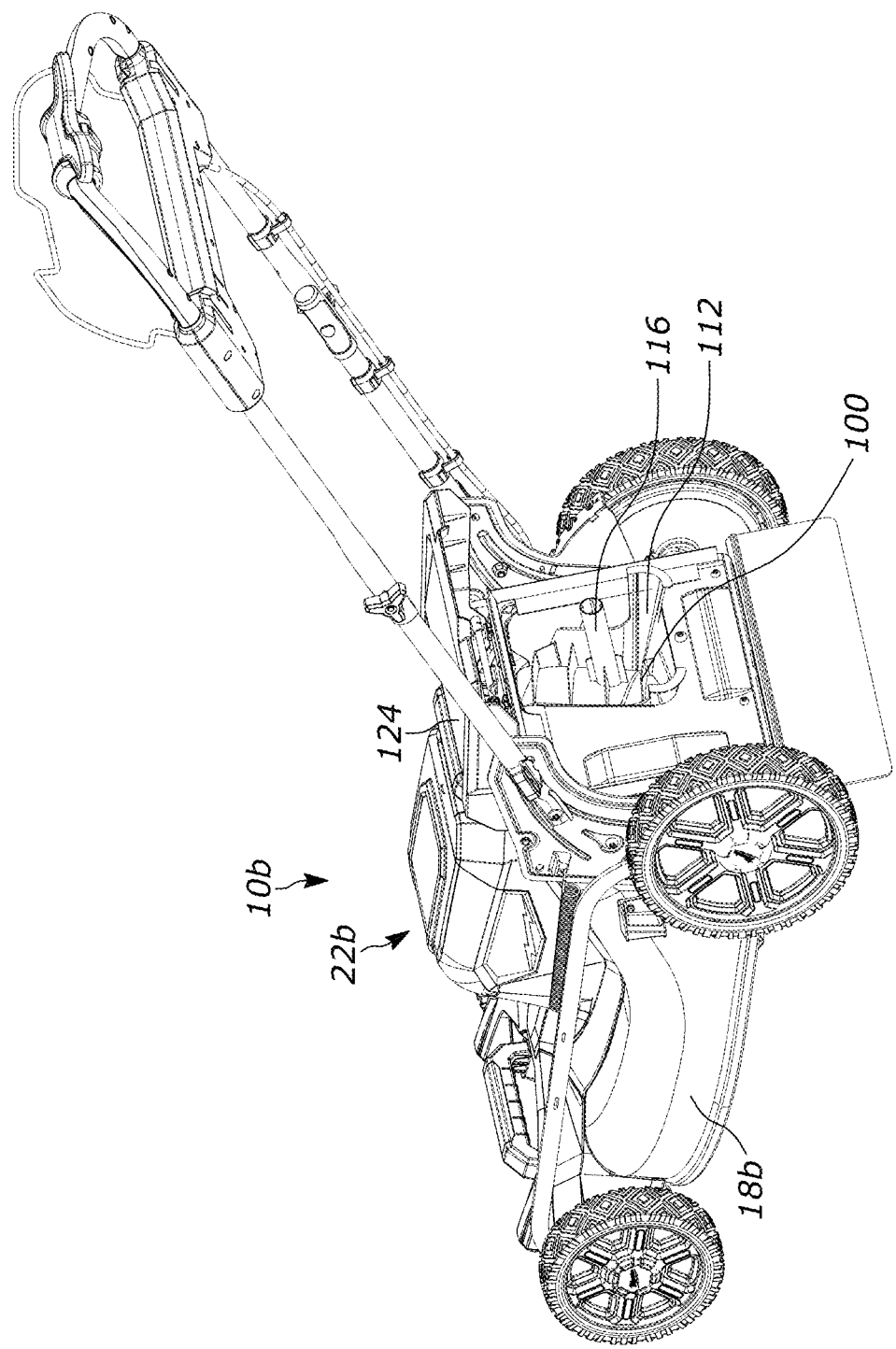
FIG. 12 is a rear perspective view of a lawnmower including a discharge accessory in accordance with another embodiment of the present disclosure.
Figure 13:
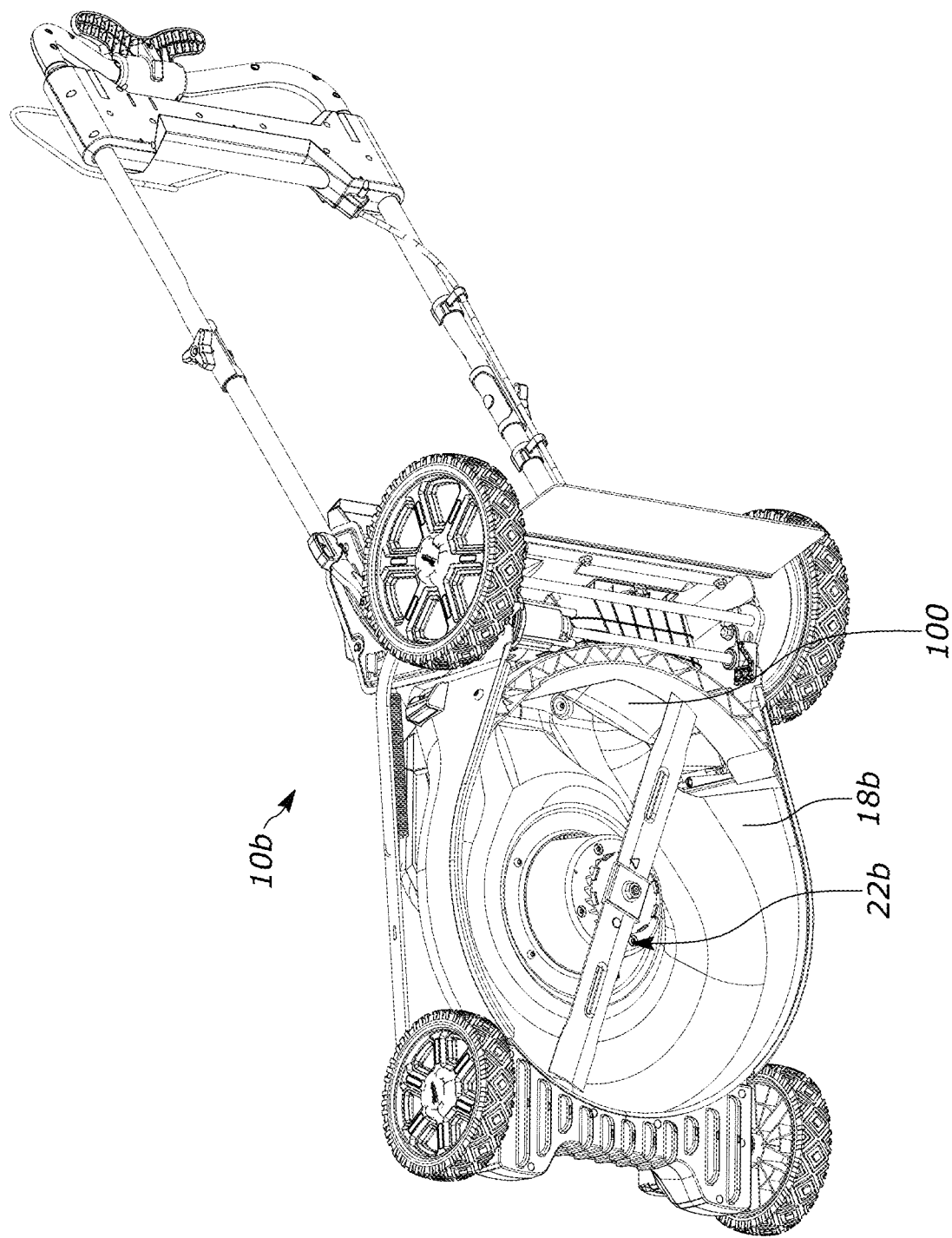
FIG. 13 is bottom perspective view of the lawnmower of FIG. 12.
Figure 14:
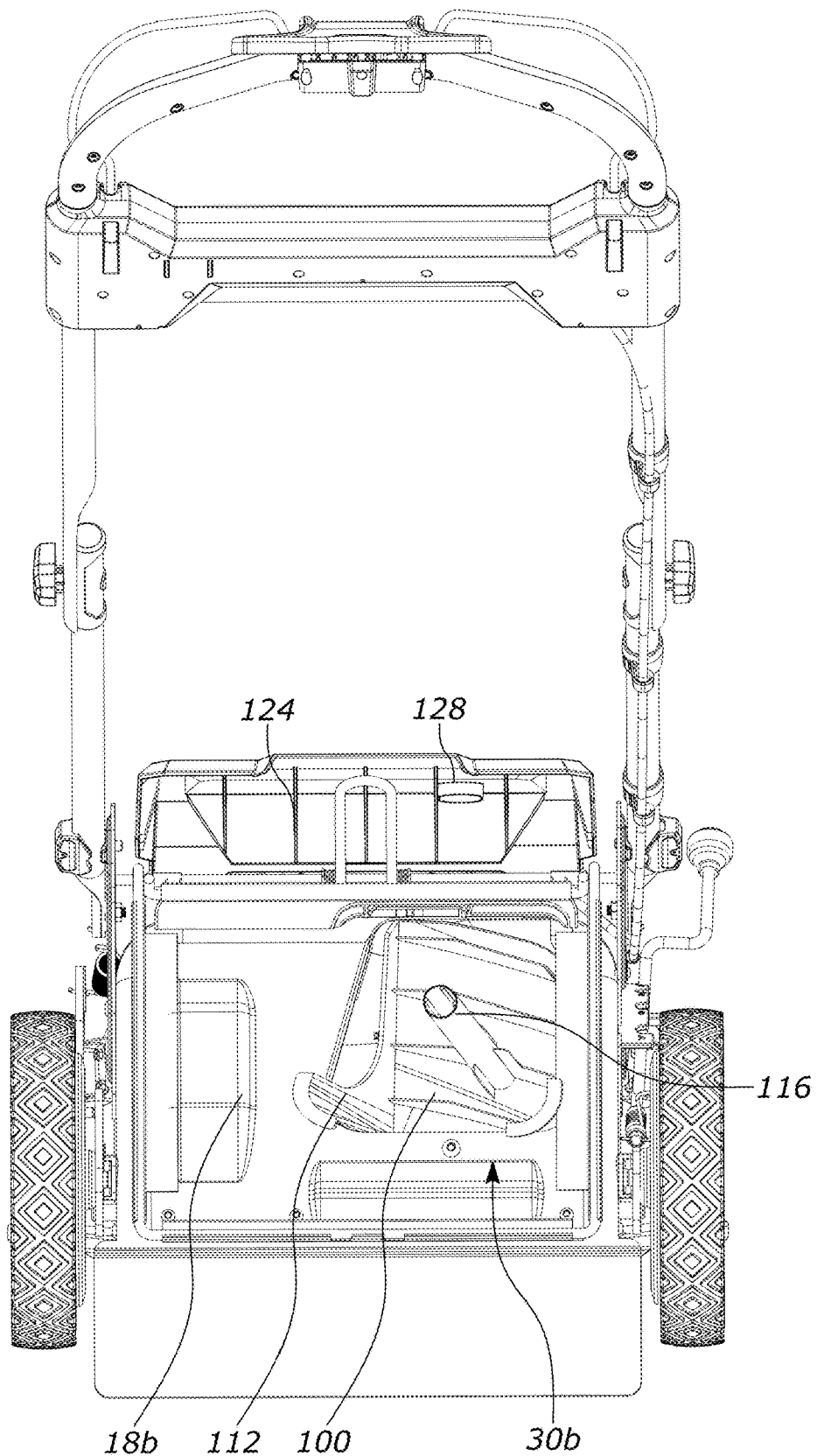
FIG. 14 is a rear elevation view of the lawnmower of FIG. 12.

FIGS. 12-14 illustrate a lawnmower 10b in accordance with another embodiment of the present disclosure, with like parts having like reference numerals plus the letter "b" appended thereon and the following differences explained below. Rather than including a side discharge accessory, the lawnmower 10b includes a mulch plug 100 that is removably attached to the ejection port 30b. When installed, the mulch plug 100 prevents grass and other vegetation from passing through the ejection port 30b.

Figure 15:
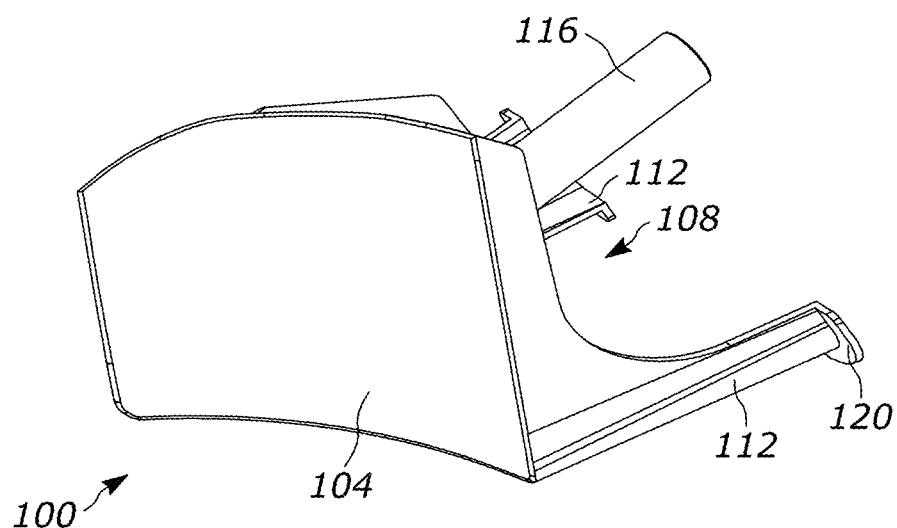
FIG. 15 is a front perspective view of the discharge accessory in FIG. 12.
Figure 16:
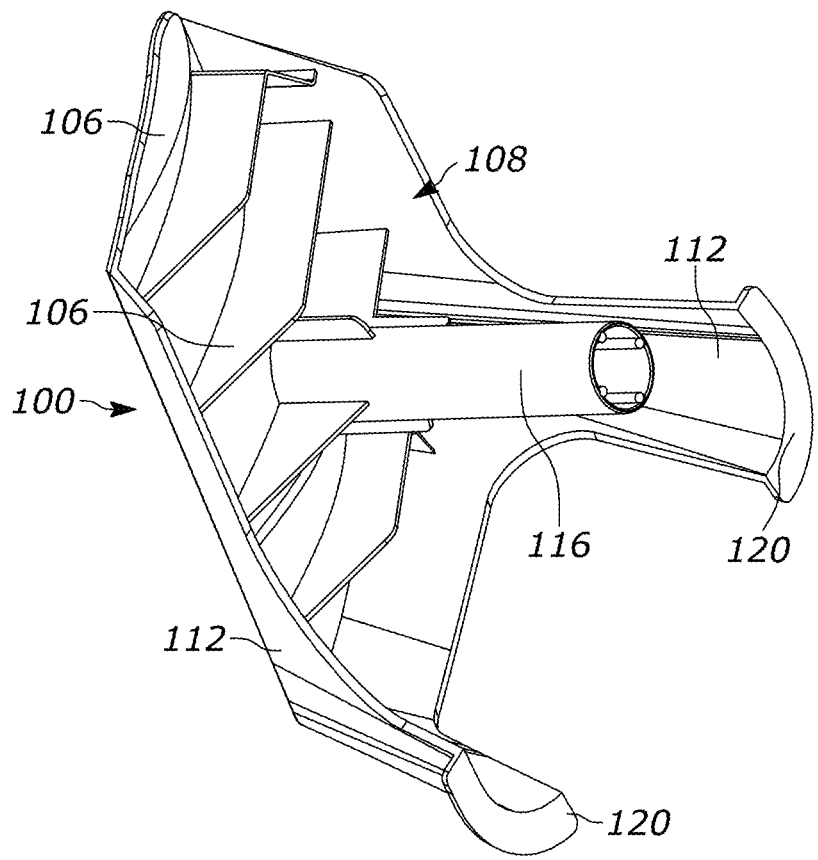
FIG. 16 is rear perspective view of the discharge accessory in FIG. 12.

As shown in FIGS. 13 and 15, the mulch plug 100 includes a curvilinear plug wall 104 that corresponds in shape to an interior of the main body 18b. A perimeter of the curvilinear plug wall 104 is similar in shape to the interior opening 38b of the ejection port 30b and sized to fit within the interior opening 38b to close the ejection port 30b. In the illustrated embodiment and best shown in FIG. 16, a plurality of ribs 106 extend along a convex side 108 of the curvilinear plug wall 104 to strengthen the wall 104. Furthermore, extending from the convex side 108 of the curvilinear plug wall 104 are a plurality of alignment legs 112. Each alignment leg 112 extends from the perimeter of the curvilinear plug wall 104 and, in the illustrated embodiment, extend from corners of the perimeter. Each of the alignment legs 112 includes a stop flange 120 configured to engage the border 46b of the exterior opening 42b to prevent the mulch plug 100 from being inserted too far into the ejection port 30b. Therefore, when installed on the lawnmower 10b, the alignment legs 112 orient the mulch plug 100 relative to the ejection port 30b.

The mulch plug 100 further includes a post 116 extending from the convex side 108 of the curvilinear plug wall 104. The post 116 is positioned within the perimeter and closer to a center of the curvilinear plug wall 104 than the alignment legs 112. In the illustrated embodiment, the post 116 is oblong in cross-section when taken perpendicular to a longitudinal axis of the post 116. The lawnmower 10b includes a cover 124 rotatably coupled to the main body 18b and spring biased toward a closed position. The cover 124 includes a recess 128 configured to engage the post 116 to help retain the mulch plug 100 in the ejection port 30b. When in the closed position, the exterior opening 42b is enclosed by the cover 124, and the cover 124 applies a securing force to the mulch plug 100 by driving the post 116 into the ejection port 30b, thereby causing the stop flanges 120 to engage the border 46b of the exterior opening 42b. To install the mulch plug 100, a user inserts the mulch plug 100 into the ejection port 30b such that the convex side 108 is facing the exterior opening 42b.

Although the disclosure has been described in detail with reference to certain embodiments, variations and modifications exist within the scope and spirit of one or more independent aspects of the disclosure as described.

Various features and advantages of the disclosure are set forth in the following claims.

What is claimed is:

1. A mulch plug accessory for a lawnmower, the mulch plug comprising:
   a curvilinear plug wall having a convex side;
   a plurality of alignment legs extending in a direction away from the convex side of the curvilinear plug wall, each alignment leg having a distal end including a stop flange; and
   a post extending in a direction away from the convex side of the curvilinear plug wall, wherein a longitudinal central axis of the post extends at an upward angle from the curvilinear plug wall.

2. The mulch plug accessory of claim 1, wherein each of the plurality of alignment legs extends from a position on a perimeter of the curvilinear plug wall.

3. The mulch plug accessory of claim 2, wherein the post extends from a position within the perimeter of the curvilinear plug wall.

4. The mulch plug accessory of claim 3, wherein a cross-section of the post is oblong.

5. The mulch plug accessory of claim 1, further comprising a plurality of ribs extending from the convex side.

6. The mulch plug accessory of claim 1, wherein the stop flange is configured to prevent the mulch plug from being inserted too far into the ejection port.

7. A mulch plug accessory for a lawnmower, the mulch plug accessory comprising:
   a curvilinear plug wall having a convex side and a concave side;
   a plurality of alignment legs extending in a direction away from the convex side of the curvilinear plug wall; and
   a post extending in a direction away from the convex side of the curvilinear plug wall,
   wherein the post is positioned closer to a center of the curvilinear plug wall than the plurality of alignment legs, and
   wherein the post and the plurality of alignment legs are non-parallel.

8. The mulch plug accessory of claim 7, wherein each of the plurality of alignment legs extends from a position on a perimeter of the curvilinear plug wall.

9. The mulch plug accessory of claim 7, wherein each of the plurality of alignment legs includes a stop flange extending from a distal end thereof, the distal end being opposite the curvilinear plug wall.

10. The mulch plug accessory of claim 9, wherein the stop flange of each of the plurality of alignment legs extends in a direction away from the post.

11. The mulch plug accessory of claim 7, wherein the curvilinear plug wall is defined by a perimeter having four corners, and wherein each of the plurality of alignment legs extends from a corner of the perimeter.

12. The mulch plug accessory of claim 11, wherein the plurality of alignment legs is two alignment legs.

13. The mulch plug accessory of claim 7, wherein a cross-section of the post is oblong.

14. The mulch plug accessory of claim 7, further comprising a plurality of ribs extending from the convex side.

15. A lawnmower comprising:
   a main body including an ejection port having an interior opening and an exterior opening, the ejection port defining an elongated channel extending between the interior opening and the exterior opening;
   a cover coupled to the main body and movable between an open position, in which the cover does not enclose the exterior opening of the ejection portion, and a closed position, in which the cover encloses the exterior opening of the ejection port; and
   a mulch plug accessory configured to be selectively disposed within the ejection port, the mulch plug accessory including
   a curvilinear plug wall having a convex side;

a plurality of alignment legs extending in a direction away from the convex side of the curvilinear plug wall, each alignment leg having a distal end including a stop flange; and a post extending in a direction away from the convex side of the curvilinear plug wall, wherein the cover includes a recess extending toward the exterior opening, and wherein the recess is configured to engage with the post when the mulch plug is disposed within the ejection port and the cover is in the closed position.

16. The lawnmower of claim 15, wherein the stop flange of each alignment leg engages with a perimeter of the exterior opening when the mulch plug is disposed within the ejection port.

17. The lawnmower of claim 15, wherein the main body has a curvilinear interior portion, and wherein the mulch plug includes a concave side opposite the convex side, the concave side of the curvilinear plug wall corresponds in shape to the curvilinear interior portion.

18. The lawnmower of claim 15, wherein each of the plurality of alignment legs extends from a position on a perimeter of the curvilinear plug wall.

19. The lawnmower of claim 18, wherein the perimeter of the curvilinear plug wall corresponds in shape to a perimeter of the interior opening such that the mulch plug accessory is configured to close the ejection port.

20. The lawnmower of claim 15, wherein the cover is biased toward the closed position.

* * * * *